(12) United States Patent
Sato et al.

(10) Patent No.: US 10,295,058 B2
(45) Date of Patent: May 21, 2019

(54) PISTON RING (71) Applicant: KABUSHIKI KAISHA RIKEN, Tokyo (JP)

(72) Inventors: Daisuke Sato, Kashiwazaki (JP); Shuichi Kamura, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 15/557,797

(22) PCT Filed: Feb. 15, 2016

(86) PCT No.: PCT/JP2016/054315
§ 371 (c)(1),
(2) Date: Sep. 12, 2017

(87) PCT Pub. No.: WO2016/143464
PCT Pub. Date: Sep. 15, 2016

(65) Prior Publication Data
US 2018/0080556 A1    Mar. 22, 2018

(30) Foreign Application Priority Data
Mar. 12, 2015  (JP) ................................ 2015-049770

(51) Int. Cl.
*F16J 9/26*   (2006.01)
*F02F 5/00*   (2006.01)

(52) U.S. Cl.
CPC .. *F16J 9/26* (2013.01); *F02F 5/00* (2013.01)

(58) Field of Classification Search
CPC ....................................... F16J 9/26; F02F 5/00
See application file for complete search history.

(56) References Cited

U.S. PATENT DOCUMENTS

| 9,067,286 B2 * | 6/2015 | Lopez ..................... F16J 9/206 |
| 9,085,056 B2 * | 7/2015 | Esser ......................... F16J 9/26 |
| 2009/0226756 A1 | 9/2009 | Ogawa et al. |
| 2011/0100318 A1 | 5/2011 | Higuchi et al. |

(Continued)

FOREIGN PATENT DOCUMENTS

| CN | 101526046 A | 9/2009 |
| CN | 102066817 A | 5/2011 |

(Continued)

OTHER PUBLICATIONS

Written Opinion of the ISA in International Patent Application No. PCT/JP2016/054315, dated May 10, 2016. 14pp.

*Primary Examiner* — Gilbert Y Lee
(74) *Attorney, Agent, or Firm* — Hauptman Ham, LLP (57) ABSTRACT

Provided is a piston ring excellent in peeling resistance, wear resistance, and thermal conductivity. A piston ring 1 includes: an annular main body 2 having a pair of side faces 2a and 2b, an outer peripheral face 2d, and an inner peripheral face 2c; and a hard coating 11 provided on the outer peripheral face 2d. When a width of the main body 2 in a first direction D1 perpendicular to the pair of side faces 2a and 2b is set to h1 mm, a width of the hard coating 11 in the first direction D1 is set to W mm, and a thickness of the hard coating 11 in a second direction D2 perpendicular to the outer peripheral face 2d is set to L mm, the following Formula (1) is satisfied: $0.003 \leq (L \cdot h1)/W \leq 0.151$.

12 Claims, 3 Drawing Sheets

(56) References Cited

U.S. PATENT DOCUMENTS

2012/0205876 A1  8/2012  Fujimura et al.
2014/0137733 A1  5/2014  Sekiya et al.

FOREIGN PATENT DOCUMENTS

| CN | 102639851 A | 8/2012 |
|---|---|---|
| CN | 103620273 A | 3/2014 |
| JP | 54-118958 U | 8/1979 |
| JP | 59-117862 U | 8/1984 |
| JP | 59-172253 U | 11/1984 |
| JP | 2008-183765 A | 8/2008 |
| JP | 2009-84604 A | 4/2009 |
| JP | 2009-287730 A | 12/2009 |
| JP | 2013-29190 A | 2/2013 |
| WO | 2011/064888 A1 | 6/2011 |
| WO | 2015/023002 A1 | 2/2015 |

\* cited by examiner

PISTON RING

RELATED APPLICATIONS

The present application is a National Phase entry of PCT International Application Number PCT/JP2016/054315, filed Feb. 15, 2016, which claims priority of Japanese Application No. 2015-049770, filed Mar. 12, 2015.

TECHNICAL FIELD

The present invention relates to a piston ring.

BACKGROUND ART

A piston ring used in an internal combustion engine is installed inside a ring groove which is formed in a side face of a piston. An outer peripheral face of the piston ring is in sliding contact with an inner wall of a cylinder bore. For example, Patent Literatures 1 to 5 describe a piston ring in which a part or all of an outer peripheral face is covered with a hard coating. Patent Literature 6 describes a piston ring provided with a titanium nitride film, which is formed by an ion plating method, as a hard coating.

CITATION LIST

Patent Literature

Patent Literature 1: PCT International Publication No. 2011/064888
Patent Literature 2: Japanese Unexamined Patent Publication No. 2009-287730
Patent Literature 3: Japanese Unexamined Utility Model Publication No. S59-172253
Patent Literature 4: Japanese Unexamined Utility Model Publication No. S59-117862
Patent Literature 5: Japanese Unexamined Utility Model Publication No. S54-118958
Patent Literature 6: Japanese Unexamined Patent Publication No. 2013-029190

SUMMARY OF INVENTION

Technical Problem

In general, the hardness of the hard coating is higher than the hardness of a main body of the piston ring. This is because the wear resistance of the piston ring increases as the hardness of the hard coating increases. However, the toughness of the hard coating becomes lower than the toughness of the main body of the piston ring as the hardness of the hard coating becomes higher. Therefore, the residual stress of the hard coating is large, and the hard coating is easily peeled off from the piston ring as the hardness of the hard coating is high and the thickness of the hard coating is large. On the other hand, the hard coating and the piston ring easily wear as the thickness of the hard coating decreases. Therefore, peeling resistance and wear resistance of the hard coating are required in the piston ring. In addition, a high thermal conductivity of the piston ring is also required in order to improve fuel economy of an engine.

An object of the present invention is to provide a piston ring excellent in peeling resistance, wear resistance, and thermal conductivity.

Solution to Problem

A piston ring according to one aspect of the present invention includes: an annular main body having a pair of side faces, an outer peripheral face, and an inner peripheral face; and a hard coating provided on the outer peripheral face, and satisfies the following Formula (1) when a width of the main body in a first direction perpendicular to the pair of side faces is set to $h_1$ mm, a width of the hard coating in the first direction is set to W mm, and a thickness of the hard coating in a second direction perpendicular to the outer peripheral face is set to L mm.

$$0.003 \leq (L \cdot h_1)/W \leq 0.151 \tag{1}$$

A piston ring according to one aspect of the present invention may satisfy the following Formula (2) when a thermal conductivity of a hard coating is set to σW/m·K.

$$0.030 \leq (L \cdot h_1 \cdot \sigma)/W \leq 6.360 \tag{2}$$

The piston ring according to the above-described aspect of the present invention may satisfy the following Formula (3).

$$0.003 \leq (L \cdot h_1)/W \leq 0.088 \tag{3}$$

A piston ring according to one aspect of the present invention may satisfy the following Formula (4) when a thermal conductivity of a hard coating is set to σW/m·K.

$$0.030 \leq (L \cdot h_1 \cdot \sigma)/W \leq 4.440 \tag{4}$$

In a piston ring according to one aspect of the present invention, a main body may include carbon of 0.45 mass % or more and 1.10 mass % or less, silicon of 0.15 mass % or more and 1.60 mass % or less, and manganese of 0.30 mass % or more and 1.15 mass % or less.

In a piston ring according to one aspect of the present invention, a main body may include at least one of chromium of 1.60 mass % or less, vanadium of 0.25 mass % or less, molybdenum of 0.35 mass % or less, and boron of 0.01 mass % or less.

In a piston ring according to one aspect of the present invention, a main body may include phosphorus of 0.002 mass % or more and less than 0.01 mass %.

In a piston ring according to one aspect of the present invention, a hard coating may include at least one film selected from a group consisting of a chromium nitride film, a titanium nitride film, a chromium carbonitride film, a titanium carbonitride film, a chromium oxynitride film, and a diamond-like carbon film.

In a piston ring according to one aspect of the present invention, a thermal conductivity σ of a hard coating may be 5 W/m·K or more.

In a piston ring according to one aspect of the present invention, a thickness L of a hard coating may be 3 μm or more and 30 μm or less.

A piston ring according to one aspect of the present invention may include a nitride layer, which is provided on at least one of a pair of side faces of a main body or on an outer peripheral face or an inner peripheral face, and a Vickers hardness of a surface of the nitride layer may be 600 [HV0.05] or more and 1300 [HV0.05] or less.

In a piston ring according to one aspect of the present invention, a thickness of a hard coating from a vertex of the hard coating in a second direction to a position 0.3 mm away from the vertex may be 3 μm or more and 10 μm or less.

In a piston ring according to one aspect of the present invention, a main body may be exposed at an end portion of an outer peripheral face.

In a piston ring according to one aspect of the present invention, a width of an end portion of an outer peripheral face may be 0.3 mm or less in a cross section of a main body perpendicular to a pair of side faces.

Advantageous Effects of Invention

According to a piston ring of the present invention, it is possible to provide the piston ring excellent in peeling resistance, wear resistance, and thermal conductivity.

DESCRIPTION OF EMBODIMENTS

Hereinafter, a piston ring (compression ring) according to an embodiment of the present invention will be described with reference to the drawings. However, the present invention is not limited to the following embodiment.

Figure 1:
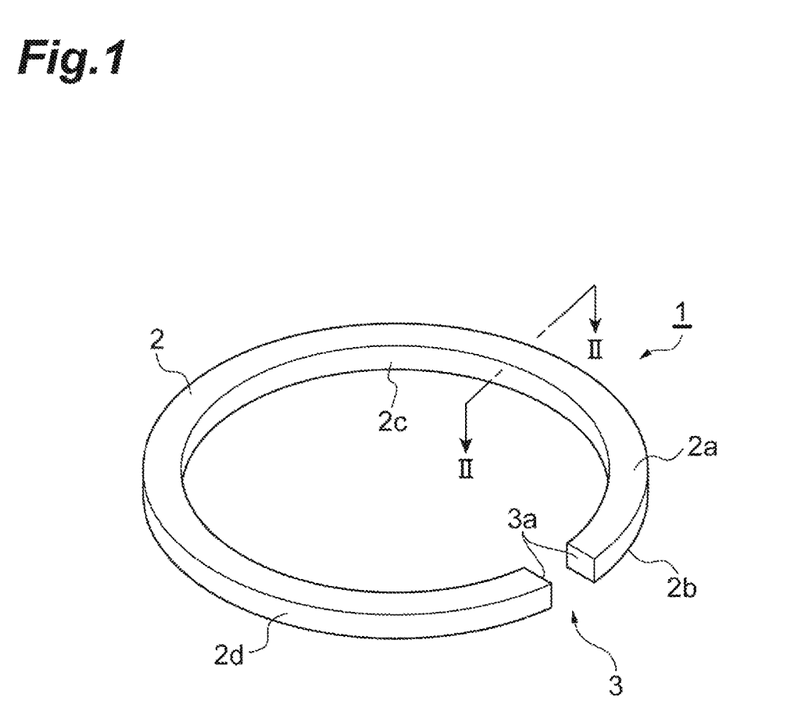
FIG. 1 is a perspective view of a piston ring according to the present embodiment.

A piston ring 1 according to the present embodiment illustrated in FIG. 1 is installed in a ring groove formed on an outer peripheral face of a piston of an internal combustion engine (for example, an automobile engine). The piston ring 1 serves a function (oil control function) of suppressing oil (oil-up) on an inner wall of a cylinder from entering a combustion chamber side from a crank chamber side as an outer peripheral face 2d slides against an inner peripheral face of a bore. In addition, the piston ring 1 serves a function (gas sealing function) of suppressing a blowby gas as the outer peripheral face 2d slides against the bore inner peripheral face. Further, the piston ring 1 serves a function (heat conduction function) of causing heat of the piston to be conducted to the inner wall of the cylinder as the outer peripheral face 2d slides against the bore inner peripheral face.

The piston ring 1 includes an annular main body 2. An abutment portion 3 (end gap portion) is formed in the main body 2. That is, the term, "annular" does not necessarily mean a closed circle. The main body 2 may be a perfect circle shape or an oval shape. The main body 2 has a pair of side faces 2a and 2b, an inner peripheral face 2c, and the outer peripheral face 2d. A shape of a cross section of the piston ring 1 in the circumferential direction is substantially rectangular. A pair of long sides forming the rectangular cross section belong to the side faces 2a and 2b. A pair of short sides forming the rectangular cross section belong to the inner peripheral face 2c and the outer peripheral face 2d.

The abutment portion 3 is formed by cutting a part of the main body 2. When the main body 2 thermally expands due to a temperature difference between the piston ring 1 and the cylinder, the abutment portion 3 narrows. That is, the abutment portion 3 suppresses deformation or distortion of the main body 2 caused by the thermal expansion. A right-angle abutment obtained by forming an abutment end face 3a at a right angle with respect to the inner peripheral face 2c and the outer peripheral face 2d is illustrated in the present embodiment. However, the abutment portion 3 may be an inclined abutment obtained by forming the abutment end face 3a to be inclined with respect to the inner peripheral face 2c and the outer peripheral face 2d. In addition, the abutment portion 3 may be a stepped abutment in which one side of the abutment end face 3a facing the side face 2a and the other side of the abutment end face 3a facing the side face 2b protrude to each other.

Figure 2:
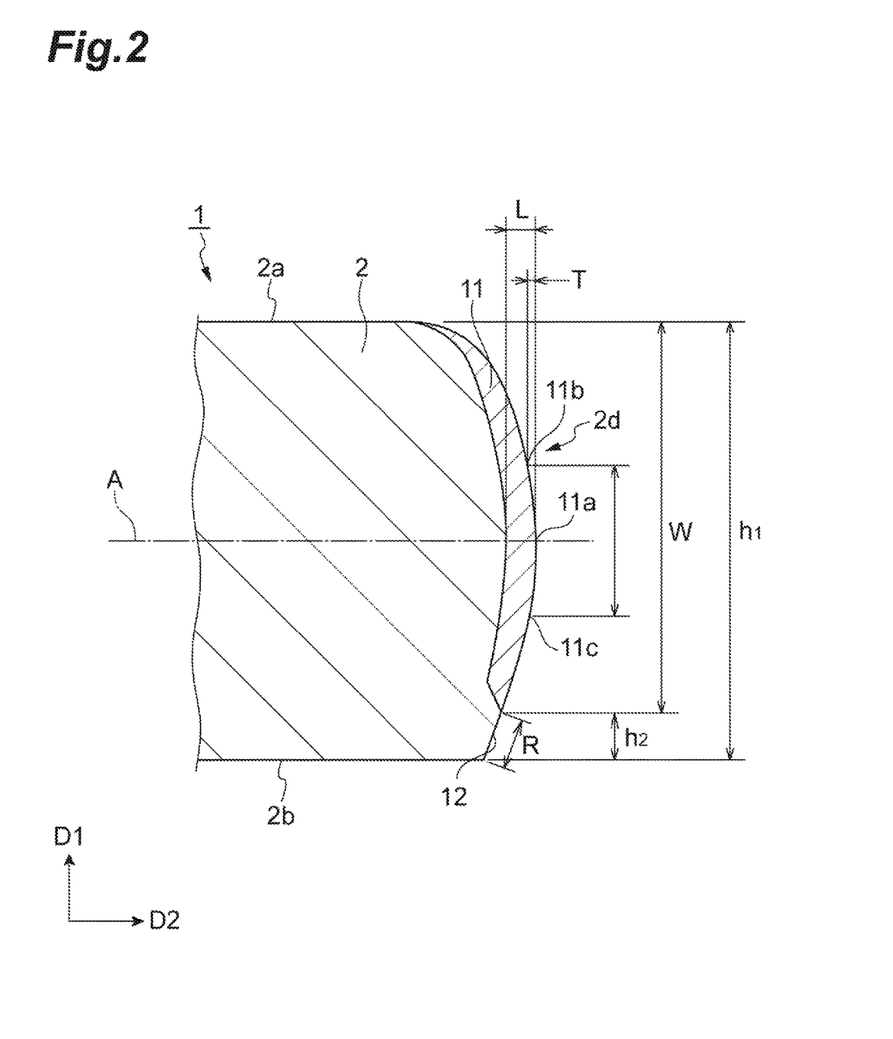
FIG. 2 schematically illustrates a part of a cross section (cross section in a circumferential direction) of the piston ring of FIG. 1 taken along line II-II.

Hereinafter, the outer peripheral face 2d of the main body 2 will be described in detail. FIG. 2 is a cross section of the piston ring 1 perpendicular to the pair of side faces 2a and 2b. Hereinafter, a direction perpendicular to the side face 2a or the side face 2b (an axial direction of the main body 2) will be referred to as a first direction D1. Hereinafter, a direction perpendicular to the inner peripheral face 2c or the outer peripheral face 2d (a radial direction of the main body 2) will be referred to as a second direction D2.

The outer peripheral face 2d is a sliding face that slides against an inner peripheral face of a bore of the cylinder when the piston ring 1 is mounted to a ring groove of the piston. As illustrated in FIG. 2, the outer peripheral face 2d has a gentle curved shape (barrel face shape) protruding outward along the second direction D2. The outer peripheral face 2d having the barrel face shape protrudes to the outermost side in the vicinity of a center line A of the main body 2 along the second direction D2.

As illustrated in FIG. 2, a hard coating 11 is formed on the surface of the outer peripheral face 2d. The hardness of the hard coating 11 is higher than the hardness of the main body 2. The hard coating 11 improves wear resistance and scuffing resistance of the piston ring 1.

The piston ring 1 is a so-called semi-inlaid piston ring. The main body 2 of the semi-inlaid piston ring 1 is exposed only at an end portion 12 on the side face 2b side of the outer peripheral face 2d. The entire region excluding the end portion 12 on the outer peripheral face 2d is covered with the hard coating 11. A width R of the end portion 12 of the outer peripheral face 2d may be 0.3 mm or less. The smaller the width R is, the smaller a chamfered portion on the side face 2b side of the piston ring 1 becomes, and a combustion gas hardly leaks from the abutment portion 3. Incidentally, the width R of the end portion 12 can be paraphrased as a width of the main body 2 exposed on the outer peripheral face 2d.

As illustrated in FIG. 2, the width of the main body 2 in the first direction D1 is expressed as $h_1$ mm. A width of the hard coating 11 in the first direction D1 is expressed as W mm. A thickness of the hard coating 11 in the second direction D2 is expressed as L mm. The piston ring 1 according to the present embodiment satisfies the following Formula (1). That is, the width $h_1$ of the main body 2, the width W of the hard coating 11, and the thickness L of the hard coating 11 satisfy the following Formula (1).

$$0.003 \leq (L \cdot h_1)/W \leq 0.151 \tag{1}$$

The unit of $(L \cdot h_1)/W$ is also mm. Effects obtained by satisfying the above-described formula (1) is as follows.

When the engine having the piston to which the piston ring 1 is mounted is driven, heat generated in the combustion chamber is first conducted from the piston to the side faces 2a and 2b or the inner peripheral face 2c of the piston ring 1 via a wall face of the ring groove. The heat conducted to the piston ring 1 is conducted to the bore inner peripheral face via the hard coating 11 covering a part of the outer peripheral face 2d, and further, is conducted from the exposed end portion 12 of the outer peripheral face 2d to the bore inner peripheral face via the oil. Here, since a thermal conductivity σ of the hard coating 11 is lower than a thermal conductivity of the main body 2, the heat conduction from the end portion 12 (the exposed main body 2) to the bore inner peripheral face via the oil becomes dominant. In this case, the heat conduction from the piston ring 1 to the bore inner peripheral face is greatly affected by a length $h_2$ of the end portion 12. In other words, the heat conduction from the piston ring 1 to the bore inner peripheral face is greatly affected by a ratio $h_1/W$ between the width $h_1$ of the main body 2 and the width W of the hard coating 11. Thus, a thermal conductivity of the piston ring 1 increases as the length $h_2$ (or $h_1/W$) of the end portion 12 increases. However, the end portion 12 (exposed main body 2) is widened as the length $h_2$ (or $h_1/W$) of the end portion 12 increases, and the main body 2 itself easily wears. Therefore, the thermal conductivity and the wear resistance are easily improved if $h_1/W$ falls within an appropriate range.

On the other hand, the wear resistance of the piston ring 1 increases as the thickness L of the hard coating 11 increases. However, the residual stress of the hard coating 11 increases as the thickness L of the hard coating 11 increases, and the hard coating 11 is easily peeled off from the main body 2. In addition, the heat conduction from the piston ring 1 to the bore inner peripheral face via the hard coating 11 is easily hindered as the thickness L of the hard coating 11 increases. Therefore, the thermal conductivity, the wear resistance, and the peeling resistance are easily improved if L falls within an appropriate range.

In the present embodiment, the ratio $(W/h_1)$ and the thickness L of the hard coating 11 satisfy the above-described formula (1), and thus, the wear resistance and the thermal conductivity of the piston ring 1 are improved, and the peeling of the hard coating 11 is suppressed.

In general, knocking easily occurs as temperature of the combustion chamber of the engine is higher. However, when the piston ring 1 according to the embodiment is mounted to the piston of the engine, the heat is easily conducted from the piston to the bore inner peripheral face, and the temperature of the piston and the temperature of the combustion chamber of the engine easily decrease. Therefore, an excessive increase in the temperature of the combustion chamber is suppressed, and knocking is also suppressed in the engine provided with the piston ring 1 according to the present embodiment. Since the knocking is suppressed, it is possible to realize the specification of the engine in which a high load is likely to be applied to the piston. That is, it is possible to increase a compression ratio or to advance an ignition timing of a spark plug in the engine provided with the piston ring 1 according to the present embodiment. Therefore, the fuel economy is improved in the engine provided with the piston ring 1 according to the present embodiment.

The value $(L \cdot h_1)/W$ may be 0.0031 or more, 0.0032 or more, 0.0041 or more, 0.0059 or more, 0.0063 or more, 0.0067 or more, 0.0107 or more, 0.0111 or more, 0.0114 or more, 0.0120 or more, 0.0125 or more, 0.0212 or more, or 0.0222 or more. In addition, $(L \cdot h_1)/W$ may be 0.0935 or less, 0.0909 or less, 0.0904 or less, 0.0889 or less, 0.0402 or less, 0.0378 or less, 0.0371 or less, 0.0344 or less, 0.0340 or less, 0.0322 or less, 0.0319 or less, 0.0295 or less, 0.0267 or less, 0.0252 or less, or 0.0248 or less.

When the thermal conductivity of the hard coating 11 is expressed as σ W/m·K, the following Formula (2) may be satisfied. When the following Formula (2) is satisfied, the wear resistance, the peeling resistance, and the thermal conductivity of the piston ring 1 are easily improved. For the same reason, the following Formula (3) or Formula (4) may be satisfied. When the following Formula (3) or Formula (4) is satisfied, particularly, the peeling of the hard coating 11 is easily suppressed. Incidentally, the unit of $(L \cdot h_1 \cdot \sigma)/W$ is mm×mm×(W/m·K)/mm, that is, $W \cdot 10^{-3}/K$.

$$0.030 \leq (L \cdot h_1 \cdot \sigma)/W \leq 6.360 \quad (2)$$

$$0.003 \leq (L \cdot h_1)/W \leq 0.088 \quad (3)$$

$$0.030 \leq (L \cdot h_1 \cdot \sigma)/W \leq 4.440 \quad (4)$$

The thermal conductivity σ of the hard coating 11 (or a thermal conductivity of a material forming the hard coating 11) may be, for example, 5 W/m·K or more. The heat conduction function of the piston ring 1 is improved as a thermal conductivity σ of the hard coating 11 increases. This is because the heat is easily conducted from the main body 2 to the bore inner peripheral face via the hard coating 11 as the thermal conductivity σ of the hard coating 11 increases. Therefore, the thermal conductivity σ of the hard coating 11 may be 10 W/m·K or more, 25 W/m·K or more, 38 W/m·K or more, 50 W/m·K or more, or 80 W/m·K or more. The thermal conductivity σ of the hard coating 11 may be 10 W/m·K or less, 25 W/m·K or less, 38 W/m·K or less, 50 W/m·K or less, or 80 W/m·K or less. The thermal conductivity of the main body 2 is not particularly limited as long as being higher than the thermal conductivity σ of the hard coating 11. The thermal conductivity σ of the hard coating 11 is freely controlled by adjusting or selecting the composition of the hard coating 11. The thermal conductivity of the main body 2 is freely controlled by adjusting or selecting the composition of a material (wire material) for the main body 2.

The thermal conductivity σ of the hard coating 11 is measured by, for example, a laser flash method or a hot disc method. In the present embodiment, the hot disc method is more preferable than the laser flash method. It is because the laser flash method is not necessarily suitable for measurement of a thermal conductivity of a thin sample, such as the hard coating, although being frequently used for measurement of a thermal conductivity of a bulk material. For example, the time required until a sample having a film thickness of 100 μm or less reaches a thermal equilibrium state is short, and thus, it is not easy to measure the thermal conductivity of the thin sample with high accuracy using the laser flash method. The following Table 1 shows thermal conductivities of materials forming the hard coating 11. The thermal conductivities in the table are values measured by the hot disc method. Coatings A, B, C and D shown in Table 1 are four ($Cr_2N$+Cr)-based hard coatings having different thermal conductivities. The ($Cr_2N$+Cr)-based hard coating is an ion plating coating having a texture in which a $Cr_2N$-phase and a Cr-phase are mixed. The thermal conductivity is controlled by adjusting a content of nitrogen in the ($Cr_2N$+Cr)-based hard coating. For example, the thermal conductivity in the hard coating described above tends to decrease along with an increase of the content of nitrogen.

TABLE 1

| Hard coating | Thermal conductivity (W/m · K) |
|---|---|
| A | 10 |
| B | 25 |
| C | 38 |
| D | 50 |
| Cr-plating | 80 |

The width (thickness) $h_1$ of the main body 2 in the first direction D1 is not particularly limited. For example, $h_1$ may be 0.77 mm or more, and may be 1.0 mm or less, 1.17 mm or less, 1.5 mm or less, 1.75 mm or less, or 2.0 mm or less.

The width W of the hard coating 11 may be the width $h_1$ of the main body 2 or less. Since the end portion 12 on the outer peripheral face 2d is not covered with the hard coating 11, the width W of the hard coating 11 is less than the width $h_1$ of the main body 2. The length $h_2$ of the end portion 12 in the first direction D1 is a value $(h_1-W)$ obtained by subtracting the width W of the hard coating 11 from the width $h_1$ of the main body 2. In other words, the width W of the hard coating 11 is $(h_1-h_2)$. The length $h_2$ may be, for example, 0.1 mm or more, or 0.2 mm or more. In addition, the length $h_2$ of the end portion 12 may be, for example, 0.4 mm or less, 0.3 mm or less, or 0.25 mm or less. When the length $h_2$ of the end portion 12 is less than 0.1 mm, the heat is hardly conducted from the piston to the bore inner peripheral face via the piston ring 1. When the length $h_2$ of the end portion 12 is more than 0.4 mm, a wear amount of the outer peripheral face of the main body 2 easily increases.

The thickness L of the hard coating 11 may be, for example, a maximum thickness of the hard coating 11 or an average thickness of the hard coating 11. In the present embodiment, the thickness L of the hard coating 11 is the maximum thickness. The thickness L of the hard coating 11 may be, for example, 0.003 mm (3 µm) or more, 0.005 mm (5 µm) or more, 0.01 mm (10 µm) or more, or 0.02 mm (20 µm) or more. In addition, the thickness L of the hard coating 11 may be, for example, 0.07 mm (70 µm) or less, 0.065 mm (65 µm) or less, 0.06 mm (60 µm) or less, 0.055 mm (55 µm) or less, 0.05 mm (50 µm) or less, 0.04 mm (40 µm) or less, or 0.03 mm (30 µm) or less. The thickness L of the hard coating 11 may be, for example, 3 µm or more and 30 µm or less, 3 µm or more and 20 µm or less, 5 µm or more and 30 µm or less, 5 µm or more and 20 µm or less, 10 µm or more and 30 µm or less, or 20 µm or more and 30 µm or less. When the thickness L of the hard coating 11 is less than 3 µm, the outer peripheral face 2d of the main body 2 easily wears. When the thickness L of the hard coating 11 is more than 70 µm, the heat is hardly conducted from the piston to the bore inner peripheral face via the piston ring 1. When the thickness L of the hard coating 11 is 30 µm or less, the peeling of the hard coating 11 is easily suppressed. When the thickness L of the hard coating 11 is more than 30 µm, the residual stress (compressive residual stress) in the hard coating 11 easily increases, and the hard coating 11 is easily peeled from the main body 2. In particular, when the hard coating 11 is formed on the outer peripheral face 2d by an ion plating method, the residual stress in the hard coating 11 easily increases, and the hard coating 11 is easily peeled off from the main body 2. Incidentally, the residual stress of the hard coating 11 is measured by an X-ray diffraction method as follows. First, the amount of change in lattice spacing of the hard coating 11 is measured based on a peak shift (change of a diffraction angle $2\theta$) on a high angle side of an X-ray diffraction spectrum of the hard coating 11. The residual stress of the hard coating 11 is calculated based on the change amount of lattice spacing.

As illustrated in FIG. 2, a vertex 11a on the surface of the hard coating 11 is positioned on the center line A of the main body 2 along the second direction D2. A distance of a first point 11b on the surface of the hard coating 11 from the vertex 11a in the first direction D1 is 0.3 mm, and the first point 11b is positioned on the side face 2a side. A distance of a second point 11c on the surface of the hard coating 11 from the vertex 11a in the first direction D1 is 0.3 mm, and the second point 11c is positioned on the side face 2b side. The first point 11b and the second point 11c may be positioned on concentric circles having the vertex 11a as the center thereof. A thickness T of the hard coating 11 in a region from the vertex 11a to a position 0.3 mm away from the vertex 11a may be 3 µm or more and 10 µm or less. In other words, the thickness T of the hard coating 11 from the vertex 11a to the first point 11b or the second point 11c may be 3 µm or more and 10 µm or less. When the thickness T of the hard coating 11 is less than 3 µm, the outer peripheral face 2d easily wears. When the thickness T of the hard coating 11 is more than 10 µm, the heat conduction from the piston to the bore inner peripheral face via the piston ring 1 is easily suppressed.

A width (a width of the sliding face in the first direction D1) of a portion of the outer peripheral face 2d in contact with the bore inner peripheral face of the cylinder may be 0.15 mm or less. In this case, it is possible to set tension of the outer peripheral face 2d with respect to a predetermined surface pressure to be low and to reduce friction of the outer peripheral face 2d.

The main body 2 is formed using, for example, cast iron or a steel material. The main body 2 formed using the cast iron or the steel material has sufficient strength, heat resistance, and elasticity. The steel material can be paraphrased as an alloy material including iron as a main component. The alloy material may be, for example, an SWOSC-V material, SUS-440B, SUP-12, SWRH62A, or the like. For example, the main body 2 may include carbon (C) of 0.45 mass % or more and 1.10 mass % or less, silicon (Si) of 0.15 mass % or more and 1.60 mass % or less, and manganese (Mn) of 0.30 mass % or more and 1.15 mass % or less. When each content of these elements falls within the above-described range, the thermal conductivity of the main body 2 is easily improved.

The main body 2 may include at least one element among chromium (Cr) of more than 0 mass % and 1.60 mass % or less, vanadium (V) of more than 0 mass % and 0.25 mass % or less, molybdenum (Mo) of more than 0 mass % and 0.35 mass % or less, and boron (B) of more than 0 mass % and 0.01 mass % or less. In this case, the wear resistance, toughness, or the like of the main body 2 is easily improved. In addition, the main body 2 may include phosphorus of 0.002 mass % or more and less than 0.01%. In this case, a phosphorus compound (for example, $Fe_3P$ or the like) is hardly segregated when chemical conversion treatment is performed on the main body 2, and surface roughness of the main body 2 can be suppressed. The passivation treatment is treatment in which a material (the cast iron or steel material for the main body 2) to be treated is immersed in a prepared acidic passivation treatment liquid to precipitate an insoluble product having a sticking property on the surface of the material to be treated by chemical reaction on the surface of the material to be treated. A specific example of the passivation treatment is treatment (phosphate treatment) in which the pair of side faces 2a and 2b of the main body 2 are covered with phosphate by a chemical method.

The hard coating 11 may be formed by, for example, a physical vapor deposition (PVD) method or may be formed by an ion plating method which is a kind of the PVD method. For example, the hard coating 11 may be an ion plating film formed using at least one of titanium (Ti) and chromium and at least one kind of carbon, nitrogen (N) and oxygen (O). Such an ion plating film may be, for example, a chromium nitride film (Cr—N film), a titanium nitride film (Ti—N film), a chromium carbonitride film (Cr—C—N film), a titanium carbonitride film (Ti—C—N Film), or a chromium oxynitride film (Cr—O—N film). Among them, the chromium nitride film is relatively excellent in wear resistance and scuffing resistance. The hard coating 11 may be a diamond-like carbon film (DLC film). The hard coating 11 may have a laminated structure. That is, the hard coating 11 may include at least one film selected from a group consisting of a chromium nitride film, a titanium nitride film, a chromium carbonitride film, a titanium carbonitride film, a chromium oxynitride film, and a diamond-like carbon film, or may be a laminate configured of two or more films among these films.

A nitride layer may be provided on the surface (at least any face of the side face 2a, the side face 2b, the outer peripheral face 2d, and the inner peripheral face 2c) of the main body 2. A thickness of the nitride layer may be about 10 μm or more and 30 μm or less. A Vickers hardness of the surface of the above-described nitride layer may be 600 [HV0.05] or more and 1300 [HV0.05] or less. The nitride layer may be, for example, a layer including a nitride of chromium. The nitride layer may be a layer (a layer including a nitride of iron) formed by nitrification of iron which is the main component of the main body 2. The nitride layer is formed, for example, by surface modification of the main body 2. As the above-described nitride layer is formed on, for example, the side faces 2a and 2b, the wear resistance of the main body 2 with respect to the ring groove of the piston is easily improved.

The hard coating 11 and the end portion 12 of the piston ring 1 may be formed by, for example, the following method.

A barrel face shape and an inlaid protrusion are formed in advance on an outer peripheral portion of the main body 2. The barrel face shape means a part that has been subjected to barrel face processing. The inlaid protrusion later becomes the end portion 12 of the outer peripheral face 2d. A step between the barrel face shape and the inlaid protrusion (a depth of a valley) determines the thickness of the hard coating 11 to be formed later. A known technique, such as cutting, grinding, wrapping, polishing, or the like may be appropriately selected as such a method of processing the outer peripheral portion of the main body 2. After forming the barrel face shape and the inlaid protrusion, the hard coating 11 is formed in a portion of the main body 2 that has been subjected to the barrel face processing. The hard coating 11 is formed by, for example, a PVD method. After forming the hard coating 11, the inlaid protrusion is removed, and further the barrel face finishing of the hard coating 11 (outer peripheral face 2d) is performed. Through these types of processing, the hard coating 11 (outer peripheral face 2d) is molded into a curved shape (substantially convex shape), and the end portion 12 is also formed. A known technique, such as wrapping and polishing, may be appropriately selected as a method of removing the inlaid protrusion and finishing the barrel face. Through the above-described steps, the hard coating 11 and the end portion 12 as illustrated in FIG. 2 are formed. In the above-described series of processing, it is possible to freely control each dimension of the main body 2 and the hard coating 11.

The present invention is not limited to the above-described embodiment. For example, the outer peripheral face 2d may be a flat face perpendicular to the side faces 2a and 2b of the main body 2. That is, the piston ring according to the present invention may have a straight face shape. The outer peripheral face 2d may be a flat surface inclined with respect to the side faces 2a and 2b of the main body 2. That is, the piston ring according to the present invention may have a tapered face shape. The entire outer peripheral face 2d may be covered by the hard coating 11. That is, the piston ring according to the present invention may be a full face type. In this case, the width W of the hard coating 11 and the width $h_1$ of the main body 2 are equal to each other, and the width R of the end portion 12 is zero.

EXAMPLES

The present invention will be described in more detail with the following Examples, but the present invention is not limited to these Examples.

Examples 1 to 5

Each piston ring according to Examples 1 to 5 was prepared by the following procedure. Except for items shown in Table 2, a manufacturing method and specification of each piston ring according to Examples 1 to 5 were the same.

The piston ring-shaped main body 2 in which the barrel face portion and the protrusion are positioned on the outer peripheral face was formed. An SWOSC-W equivalent material was used as the wire material. A nominal diameter of the main body 2 was adjusted to about 87 mm. A thickness of the main body 2 in the radial direction (the first direction D1) was about 2.5 mm. The width $h_1$ of the main body 2 was about 1.2 mm.

The hard coating 11 was formed on the outer peripheral face of the main body 2 by the ion plating method. The composition of the hard coating 11 formed in the respective Examples was as shown in the following Table 2. After forming the hard coating 11, the protrusion was removed from the outer peripheral face. After removing the protrusion, the outer peripheral face was subjected to the barrel face finishing, thereby forming the semi-inlaid piston ring 1 that includes the hard coating 11 and the end portion 12 on the outer peripheral face 2d.

The width $h_1$ of the main body 2, the thickness L of the hard coating 11, the width W of the hard coating 11, and the length $h_2$ of the end portion 12 were adjusted to values shown in the following Table 2 at the time of preparing the respective piston rings described above. Values $(L \cdot h_1)/W$ calculated from dimensions of the respective piston rings are shown in the following Table 2.

Incidentally, the thickness L of the hard coating 11 was measured by the following method. First, a cross section of the piston ring 1 perpendicular to the side faces 2a and 2b was polished into a mirror face shape. A photograph of the polished cross section was captured by an optical microscope. The maximum thickness L of the hard coating 11 was measured based on this photograph.

Examples 6 to 10

A length of a short side in a cross section of the wire material was adjusted to about 1.5 mm at the time of preparing each piston ring according to Examples 6 to 10. The composition of the hard coating 11 in the respective Examples was as shown in the following Table 3. Except for these points, the respective piston rings of Examples 6 to 10 were prepared in the same procedure as in Examples 1 to 5. The width $h_1$ of the main body 2, the thickness L of the hard coating 11, the width W of the hard coating 11, and the length $h_2$ of the end portion 12 were adjusted to values shown in the following Table 3 at the time of preparing the respective piston rings. Values $(L \cdot h_1)/W$ calculated from dimensions of the respective piston rings are shown in the following Table 3.

Examples 11 to 15

A length of a short side in a cross section of the wire material was adjusted to about 1.75 mm at the time of preparing each piston ring according to Examples 11 to 15. The composition of the hard coating 11 in the respective Examples was as shown in the following Table 4. Except for these points, the respective piston rings of Examples 11 to 15 were prepared in the same procedure as in Examples 1 to 5. The width $h_1$ of the main body 2, the thickness L of the hard coating 11, the width W of the hard coating 11, and the length $h_2$ of the end portion 12 were adjusted to values shown in the following Table 4 at the time of preparing the respective piston rings. Values $(L \cdot h_1)/W$ calculated from dimensions of the respective piston rings are shown in the following Table 4.

Examples 16 to 20

A length of a short side in a cross section of the wire material was adjusted to about 2.0 mm at the time of preparing each piston ring according to Examples 16 to 20. The composition of the hard coating 11 in the respective Examples was as shown in the following Table 5. Except for these points, the respective piston rings of Examples 16 to 20 were prepared in the same procedure as in Examples 1 to 5. The width $h_1$ of the main body 2, the thickness L of the hard coating 11, the width W of the hard coating 11, and the length $h_2$ of the end portion 12 were adjusted to values shown in the following Table 5 at the time of preparing the respective piston rings. Values $(L \cdot h_1)/W$ calculated from dimensions of the respective piston rings are shown in the following Table 5.

Examples 21 to 25

A length of a short side in a cross section of the wire material was adjusted to about 0.8 mm at the time of preparing each piston ring according to Examples 21 to 25. The composition of the hard coating 11 in the respective Examples was as shown in the following Table 6. Except for these points, the respective piston rings of Examples 21 to 25 were prepared in the same procedure as in Examples 1 to 5. The width $h_1$ of the main body 2, the thickness L of the hard coating 11, the width W of the hard coating 11, and the length $h_2$ of the end portion 12 were adjusted to values shown in the following Table 6 at the time of preparing the respective piston rings. Values $(L \cdot h_1)/W$ calculated from dimensions of the respective piston rings are shown in the following Table 6.

Examples 26 to 30

A length of a short side in a cross section of the wire material was adjusted to about 1.0 mm at the time of preparing each piston ring according to Examples 26 to 30. The composition of the hard coating 11 in the respective Examples was as shown in the following Table 7. Except for these points, the respective piston rings of Examples 26 to 30 were prepared in the same procedure as in Examples 1 to 5. The width $h_1$ of the main body 2, the thickness L of the hard coating 11, the width W of the hard coating 11, and the length $h_2$ of the end portion 12 were adjusted to values shown in the following Table 7 at the time of preparing the respective piston rings. Values $(L \cdot h_1)/W$ calculated from dimensions of the respective piston rings are shown in the following Table 7.

Comparative Examples 1 to 8

Each piston ring according to Comparative Examples 1 to 8 was prepared in the same procedure as in the above-described Examples except that a size of the wire material and composition of the hard coating 11 were different. The composition of the hard coating 11 in the respective Comparative Examples was as shown in the following Table 8. The width $h_1$ of the main body 2, the thickness L of the hard coating 11, the width W of the hard coating 11, and the length $h_2$ of the end portion 12 were adjusted to values shown in the following Table 8 at the time of preparing the respective piston rings. Values $(L \cdot h_1)/W$ calculated from dimensions of the respective piston rings are shown in the following Table 8. All the values $(L \cdot h_1)/W$ in Comparative Examples 1, 2, 5 and 6 were less than 0.003. All the values $(L \cdot h_1)/W$ in Comparative Examples 3, 4, 7 and 8 were more than 0.151.

[Evaluation of Thermal Conductivity]

The thermal conductivity σ of the hard coating of Example 1 was obtained by the following hot disc method. A hot disc apparatus for measuring thermophysical characteristics TPA-501 manufactured by Kyoto Electronics Manufacturing Co., Ltd.) was used as a thermal conductivity measurement apparatus. A hard coating having a thickness of 50 μm was formed on both faces of a substrate with a known thermal conductivity as the sample. Two samples were prepared in this manner. A substrate made of a SUS304 material was used as the substrate. A dimension of the substrate was 48 mm×48 mm×0.2 mm. The hard coating was formed by the ion plating method under the same conditions as those at the time of preparing the piston ring of Example 1. Next, a sensor having a thickness of 0.06 mm was sandwiched between the two samples. A nickel wire covered by polyimide and having a double spiral structure (double helical structure) was used as the sensor. The sample was caused to generate heat by flowing current having a constant value to the sensor for a predetermined time. Accordingly, a change in electrical resistance was derived from a temperature rise (temperature change) of the sensor, and the thermal conductivity σ of the hard coating was calculated. In the above-described hot disc method, a thermal conductivity in an in-plane direction of the sample is measured. Therefore, the thermal conductivity σ of the hard coating is calculated by subtracting a thermal conductivity of the substrate from the measured thermal conductivity based on a ratio between a thickness of the substrate and the thickness of the hard coating. For such calculation of the thermal conductivity σ of the hard coating, "measurement of TPA-SLAB high-thermal-conductivity, thin plate sample," (manufactured by Kyoto Electronics Industry Co., Ltd.) which is analysis software, was used.

Each thermal conductivity σ of the hard coatings of the other Examples and Comparative Examples was also obtained using the same method as in Example 1. The thermal conductivities 6 of the hard coatings of the respective Examples and Comparative Examples are shown in the following Tables 2 to 8. Values $(L \cdot h_1 \cdot \sigma)/W$ of the respective Examples and Comparative Examples calculated based on the thermal conductivities 6 obtained by the hot disc method are shown in the following Tables 2 to 8.

[Evaluation of Peeling Resistance]

Figure 3A:
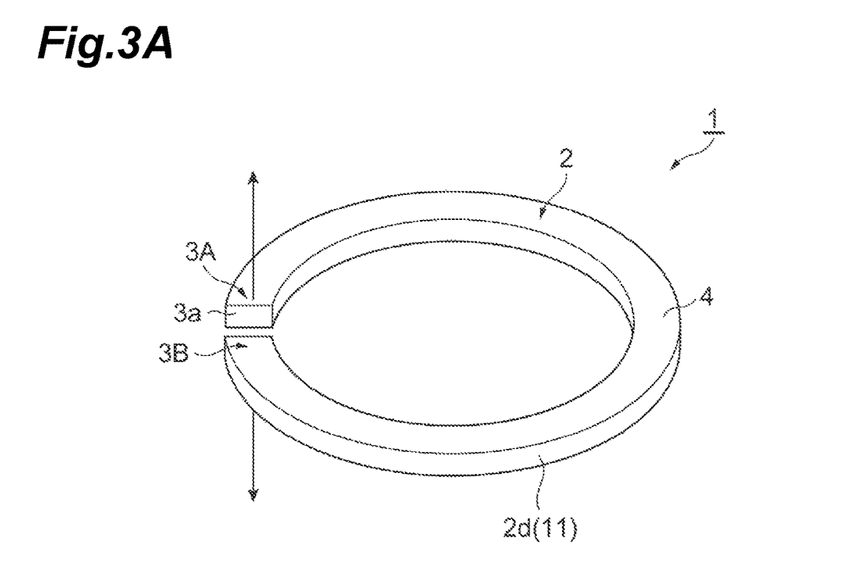
FIG. 3A is a perspective view of the piston ring during a twist test.
Figure 3B:
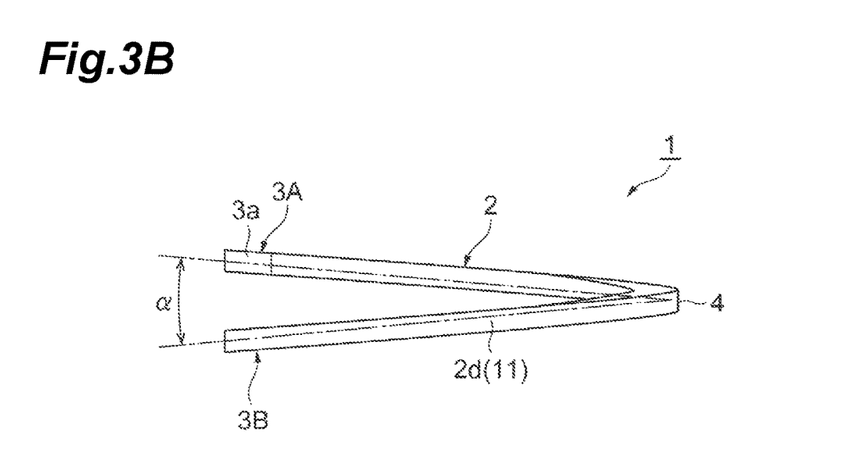
FIG. 3B is a side view of the piston ring during the twist test.

The following twist test was conducted using the piston rings of the respective Examples and Comparative Examples. The twist test aims to evaluate the peeling resistance of the piston ring (adhesion between the main body and the hard coating). As illustrated in FIG. 3A, distal ends 3A and 3B positioned on the abutment portion 3 side are separated in opposite directions along the axial direction in the twist test. As a result, shearing stress is applied to the main body 2 and the hard coating 11 in the piston ring 1 (see FIG. 2), and a twisting force is applied to a portion 4 of the main body 2 opposite to the abutment portion 3. Further, a distance between the distal ends 3A and 3B was increased, and an angle (twist angle α) formed by the distal ends 3A and 3B when the hard coating 11 is peeled off from the main body 2 was measured as illustrated in FIG. 3B. The twist angle α is 0° or larger and 180° or smaller. The piston ring is more excellent in the peeling resistance as the twist angle α increases. In other words, the hard coating 11 strongly adheres to the main body as the twist angle α increases. The twist angles α of the respective Example and Comparative Examples are shown in Tables 2 to 8. In the respective Tables, 180° means that the hard coating 11 was not peeled off from the main body 2.

[Evaluation of Wear Resistance]

Each of the piston ring of Examples and Comparative Examples was mounted as a top ring on a piston of a four-cylinder water-cooled supercharger-equipped diesel engine with a bore diameter of 87 mm. A second ring and an oil control ring assembled to the piston had the same specification. Next, the diesel engine was operated for 10 hours under a full-load condition at 5200 rpm (rotation per minute) using light oil as fuel. After the operation, the wear amount of the outer peripheral face (that is, the sliding face) of the top ring (a thickness of the worn outer peripheral face) was measured. Each wear amount of Examples and Comparative Examples is shown in the following Tables 2 to 8. Meanwhile, the wear amount shown in the following Tables 2 to 8 is a relative value (ratio) obtained by dividing each wear amount of Examples and Comparative Examples by the wear amount of Comparative Example 1.

TABLE 2

|  | $h_1$ (mm) | L (mm) | $h_2$ (mm) | W (mm) | $(L \cdot h_1)/W$ | σ (W/m · K) | $(L \cdot h_1 \cdot \sigma)/W$ | Composition of hard coating | Wear amount (—) | α (°) |
|---|---|---|---|---|---|---|---|---|---|---|
| Example 1 | 1.17 | 0.003 | 0.1 | 1.07 | 0.0032804 | 38 | 0.124654206 | C | 0.9 | 180 |
| Example 2 | 1.17 | 0.01 | 0.2 | 0.97 | 0.0120619 | 10 | 0.120618557 | A | 0.8 | 180 |
| Example 3 | 1.18 | 0.005 | 0.25 | 0.93 | 0.0063441 | 25 | 0.158602151 | B | 0.85 | 180 |
| Example 4 | 1.19 | 0.03 | 0.3 | 0.89 | 0.0401124 | 50 | 2.005617978 | D | 0.6 | 180 |
| Example 5 | 1.19 | 0.06 | 0.4 | 0.79 | 0.0903797 | 50 | 4.518987342 | D | 0.5 | 160 |

TABLE 3

|  | $h_1$ (mm) | L (mm) | $h_2$ (mm) | W (mm) | $(L \cdot h_1)/W$ | σ (W/m · K) | $(L \cdot h_1 \cdot \sigma)/W$ | Composition of hard coating | Wear amount (—) | α (°) |
|---|---|---|---|---|---|---|---|---|---|---|
| Example 6 | 1.47 | 0.02 | 0.3 | 1.17 | 0.0251282 | 10 | 0.251282051 | A | 0.8 | 180 |
| Example 7 | 1.47 | 0.03 | 0.1 | 1.37 | 0.0321898 | 38 | 1.223211679 | C | 0.75 | 180 |
| Example 8 | 1.48 | 0.003 | 0.4 | 1.08 | 0.0041111 | 25 | 0.102777778 | B | 0.9 | 180 |
| Example 9 | 1.49 | 0.01 | 0.1 | 1.39 | 0.0107194 | 10 | 0.107194245 | A | 0.6 | 180 |
| Example 10 | 1.49 | 0.065 | 0.4 | 1.09 | 0.0888532 | 50 | 4.44266055 | D | 0.6 | 170 |

TABLE 4

|  | $h_1$ (mm) | L (mm) | $h_2$ (mm) | W (mm) | $(L \cdot h_1)/W$ | σ (W/m · K) | $(L \cdot h_1 \cdot \sigma)/W$ | Composition of hard coating | Wear amount (—) | α (°) |
|---|---|---|---|---|---|---|---|---|---|---|
| Example 11 | 1.72 | 0.003 | 0.1 | 1.62 | 0.0031852 | 38 | 0.121037037 | C | 0.85 | 180 |
| Example 12 | 1.72 | 0.03 | 0.2 | 1.52 | 0.0339474 | 38 | 1.29 | C | 0.8 | 180 |
| Example 13 | 1.73 | 0.03 | 0.1 | 1.63 | 0.0318405 | 10 | 0.318404908 | A | 0.8 | 180 |
| Example 14 | 1.74 | 0.02 | 0.1 | 1.64 | 0.0212195 | 25 | 0.530487805 | B | 0.6 | 180 |
| Example 15 | 1.74 | 0.07 | 0.4 | 1.34 | 0.0908955 | 50 | 4.544776119 | D | 0.7 | 170 |

TABLE 5

|  | $h_1$ (mm) | L (mm) | $h_2$ (mm) | W (mm) | $(L \cdot h_1)/W$ | σ (W/m · K) | $(L \cdot h_1 \cdot \sigma)/W$ | Composition of hard coating | Wear amount (—) | α (°) |
|---|---|---|---|---|---|---|---|---|---|---|
| Example 16 | 1.97 | 0.003 | 0.1 | 1.87 | 0.0031604 | 38 | 0.120096257 | C | 0.9 | 180 |
| Example 17 | 1.97 | 0.02 | 0.2 | 1.77 | 0.0222599 | 25 | 0.556497175 | B | 0.65 | 180 |
| Example 18 | 1.98 | 0.01 | 0.4 | 1.58 | 0.0125316 | 10 | 0.125316456 | A | 0.6 | 180 |
| Example 19 | 1.99 | 0.025 | 0.3 | 1.69 | 0.0294379 | 38 | 1.118639053 | C | 0.75 | 180 |
| Example 20 | 1.99 | 0.07 | 0.5 | 1.49 | 0.0934899 | 50 | 4.674496644 | D | 0.6 | 160 |

TABLE 6

|  | $h_1$ (mm) | L (mm) | $h_2$ (mm) | W (mm) | $(L \cdot h_1)/W$ | σ (W/m · K) | $(L \cdot h_1 \cdot \sigma)/W$ | Composition of hard coating | Wear amount (—) | α (°) |
|---|---|---|---|---|---|---|---|---|---|---|
| Example 21 | 0.77 | 0.01 | 0.1 | 0.67 | 0.0114925 | 38 | 0.436716418 | C | 0.85 | 180 |
| Example 22 | 0.78 | 0.02 | 0.15 | 0.63 | 0.0247619 | 10 | 0.247619048 | A | 0.8 | 180 |
| Example 23 | 0.78 | 0.005 | 0.2 | 0.58 | 0.0067241 | 25 | 0.168103448 | B | 0.85 | 180 |
| Example 24 | 0.79 | 0.03 | 0.1 | 0.69 | 0.0343478 | 50 | 1.717391304 | D | 0.65 | 180 |
| Example 25 | 0.79 | 0.03 | 0.15 | 0.64 | 0.0370313 | 50 | 1.8515625 | D | 0.6 | 180 |

TABLE 7

| | $h_1$ (mm) | L (mm) | $h_2$ (mm) | W (mm) | $(L \cdot h_1)/W$ | σ (W/m·K) | $(L \cdot h_1 \cdot \sigma)/W$ | Composition of hard coating | Wear amount (—) | α (°) |
|---|---|---|---|---|---|---|---|---|---|---|
| Example 26 | 0.97 | 0.005 | 0.15 | 0.82 | 0.0059146 | 38 | 0.224756098 | C | 0.85 | 180 |
| Example 27 | 0.97 | 0.03 | 0.2 | 0.77 | 0.0377922 | 25 | 0.944805195 | B | 0.8 | 180 |
| Example 28 | 0.98 | 0.02 | 0.25 | 0.73 | 0.0268493 | 10 | 0.268493151 | A | 0.75 | 180 |
| Example 29 | 0.99 | 0.01 | 0.1 | 0.89 | 0.0111236 | 50 | 0.556179775 | D | 0.6 | 180 |
| Example 30 | 0.99 | 0.03 | 0.25 | 0.74 | 0.0401351 | 50 | 2.006756757 | D | 0.65 | 180 |

TABLE 8

| | $h_1$ (mm) | L (mm) | $h_2$ (mm) | W (mm) | $(L \cdot h_1)/W$ | σ (W/m·K) | $(L \cdot h_1 \cdot \sigma)/W$ | Composition of hard coating | Wear amount (—) | α (°) |
|---|---|---|---|---|---|---|---|---|---|---|
| Comparative example 1 | 0.98 | 0.001 | 0.08 | 0.9 | 0.0010889 | 25 | 0.027222222 | B | 1 | 180 |
| Comparative example 2 | 1.19 | 0.001 | 0.4 | 0.79 | 0.0015063 | 10 | 0.015063291 | A | 2 | 180 |
| Comparative example 3 | 1.47 | 0.1 | 0.6 | 0.87 | 0.1689655 | 50 | 8.448275862 | D | 1.3 | 150 |
| Comparative example 4 | 1.73 | 0.09 | 0.8 | 0.93 | 0.1674194 | 38 | 6.361935484 | C | 1.1 | 90 |
| Comparative example 5 | 1.98 | 0.001 | 0.5 | 1.48 | 0.0013378 | 10 | 0.013378378 | A | 1.4 | 180 |
| Comparative example 6 | 1.99 | 0.002 | 0.08 | 1.91 | 0.0020838 | 10 | 0.020837696 | A | 1.5 | 180 |
| Comparative example 7 | 1.48 | 0.08 | 0.8 | 0.68 | 0.1741176 | 38 | 6.616470588 | C | 1.4 | 80 |
| Comparative example 8 | 1.72 | 0.09 | 0.7 | 1.02 | 0.1517647 | 50 | 7.588235294 | D | 1.8 | 70 |

As a result of the above-described twist test, all the twist angles α of Examples were 160° or larger. On the other hand, the twist angles α of Comparative Examples 3, 4, 7, and 8 were 150° or less. It is considered that such a difference in the twist angle α (a difference in peeling resistance) is attributable to a fact that $(L \cdot h_1)/W$ in each of Comparative Examples 3, 4, 7, and 8 exceeds 0.151. In addition, the twist angles α of Examples 1 to 4, 6 to 9, 11 to 14, 16 to 19 and 21 to 30 were 180°. That is, the hard coating was not peeled off from the main body in Examples 1 to 4, 6 to 9, 11 to 14, 16 to 19 and 21 to 30. It is considered that the excellent peeling resistance of these Examples is attributable to a fact that $(L \cdot h_1)/W$ of each of Examples 1 to 4, 6 to 9, 11 to 14, 16 to 19 and 21 to 30 is 0.003 or more and 0.088 or less. In addition, it is considered that the excellent peeling property of each of Examples 1 to 4, 6 to 9, 11 to 14, 16 to 19 and 21 to 30 is attributable to a fact that the thickness L of each hard coating is 3 μm or more and 30 μm or less.

As a result of the above-described wear test, it was confirmed that the wear resistance of all of Examples 1 to 30 was more excellent than those of all of Comparative Examples. It is considered that this result is attributable to a fact that $(L \cdot h_1)/W$ in each of Examples 1 to 30 was 0.003 or more and 0.151 or less.

INDUSTRIAL APPLICABILITY

The piston ring according to the present invention is suitable as, for example, a top ring of an automobile engine.

The invention claimed is:

1. A piston ring comprising:
   an annular main body having a pair of side faces, an outer peripheral face, and an inner peripheral face; and
   a coating film provided on the outer peripheral face, wherein a thermal conductivity σ of the coating film is lower than that of the main body, and the thermal conductivity σ of the coating film is 5 W/m·K or more,
   wherein a thickness of the coating film from a vertex of the coating film in a second direction to a position 0.3 mm away from the vertex ranges from 3 μm or more to 10 μm or less, and
   wherein the piston ring satisfies a following Formula (1) when a width of the main body in a first direction perpendicular to the pair of side faces is set to $h_1$ mm, a width of the coating film in the first direction is set to W mm, and the thickness of the coating film in the second direction perpendicular to the outer peripheral face is set to L mm $$0.003 \leq (L \cdot h_1)/W \leq 0.151 \qquad (1).$$

2. The piston ring according to claim 1 satisfying a following Formula (2)

$$0.030 \leq (L \cdot h_1 \cdot \sigma)/W \leq 6.360 \qquad (2).$$

3. The piston ring according to claim 1 satisfying a following Formula (3)

$$0.003 \leq (L \cdot h_1)/W \leq 0.088 \qquad (3).$$

4. The piston ring according to claim 1 satisfying a following Formula (4)

$$0.030 \leq (L \cdot h_1 \cdot \sigma)/W \leq 4.440 \qquad (4).$$

5. The piston ring according to claim 1, wherein the main body includes carbon of 0.45 mass % or more and 1.10 mass % or less, silicon of 0.15 mass % or more and 1.60 mass % or less, and manganese of 0.30 mass % or more and 1.15 mass % or less.

6. The piston ring according to claim 1, wherein the main body includes at least one of chromium of 1.60 mass % or less, vanadium of 0.25 mass % or less, molybdenum of 0.35 mass % or less, and boron of 0.01 mass % or less.

7. The piston ring according to claim 1, wherein
the main body includes phosphorus of 0.002 mass % or more and less than 0.01 mass %.

8. The piston ring according to claim 1, wherein
the coating film includes at least one film selected from a group consisting of a chromium nitride film, a titanium nitride film, a chromium carbonitride film, a titanium carbonitride film, a chromium oxynitride film, and a diamond-like carbon film.

9. The piston ring according to claim 1, wherein
the thickness L of the coating film ranges from 3 μm or more to 30 μm or less.

10. The piston ring according to claim 1, further comprising
a nitride layer provided on at least one of the pair of side faces of the main body or on the outer peripheral face or the inner peripheral face,
wherein a Vickers hardness of a surface of the nitride layer is 600 [HV0.05] or more and 1300 [HV0.05] or less.

11. The piston ring according to claim 1, wherein
the main body is exposed at an end portion of the outer peripheral face.

12. The piston ring according to claim 11, wherein
a width of the end portion of the outer peripheral face is 0.3 mm or less in a cross section of the main body perpendicular to the pair of side faces.

* * * * *